United States Patent
Sobel et al.

[11] 3,919,343
[45] Nov. 11, 1975

[54] ISOBUTANE-BUTYLENE ALKYLATION PROCESS

[75] Inventors: Jay E. Sobel, Highland Park; Robert F. Anderson, La Grange Park, both of Ill.

[73] Assignee: Universal Oil Products Company, Des Plaines, Ill.

[22] Filed: May 8, 1974

[21] Appl. No.: 467,974

[52] U.S. Cl. ............................ 260/683.48
[51] Int. Cl.² ............................ C07C 3/54
[58] Field of Search .................. 208/683.48

[56] References Cited
UNITED STATES PATENTS

| | | | |
|---|---|---|---|
| 3,249,650 | 5/1966 | Fenske | 260/683.48 |
| 3,729,526 | 4/1973 | Anderson | 260/683.48 |
| 3,755,492 | 8/1973 | Anderson | 260/683.48 |
| 3,775,510 | 11/1973 | Hutson, Jr. et al. | 260/683.48 |

*Primary Examiner*—Delbert E. Gantz
*Assistant Examiner*—G. J. Crasanakis
*Attorney, Agent, or Firm*—James R. Hoatson, Jr.; Thomas K. McBride; William H. Page II

[57] ABSTRACT

A process for producing an alkylation reaction product from isobutane and butylenes, utilizing hydrogen fluoride alkylation catalyst, by the steps of mixing butylenes and isobutane alkylation feedstocks containing a minor amount of inert propane with recycle isobutane to form a hydrocarbon reactor charge stream; contacting the hydrocarbon reactor charge stream with a hydrogen fluoride alkylation catalyst in an alkylation reactor, settling the resulting mixture to provide a first settled hydrocarbon phase and a settled catalyst phase and recycling the settled catalyst phase to the reactor; fractionating the first settled hydrocarbon phase in an isobutane stripper to provide a first overhead fraction comprising isobutane, propane and hydrogen fluoride and a first bottoms fraction comprising the alkylation reaction product, and recovering the reaction product from the first bottoms fraction; partially condensing the first overhead fraction to provide a condensate stream comprising isobutane and a vaporous stream comprising hydrogen fluoride, isobutane and propane, and utilizing the condensate stream to provide the recycle isobutane component of the reactor charge stream; totally condensing the vaporous stream and settling the resulting condensed liquids to provide a second settled hydrocarbon phase and a hydrogen fluoride phase and passing the hydrogen fluoride phase into the settled catalyst phase; fractionating a first portion of the second hydrocarbon phase to provide an overhead fraction comprising hydrogen fluoride and a bottoms fraction comprising propane and isobutane, passing the overhead fraction to the total condensation step and removing the bottoms fraction from the process to maintain propane balance in the process; and, passing at least a part of the remainder of the second hydrocarbon phase into the hydrocarbon reactor charge stream in admixture with the condensate stream produced in the partial condensation step.

5 Claims, 1 Drawing Figure

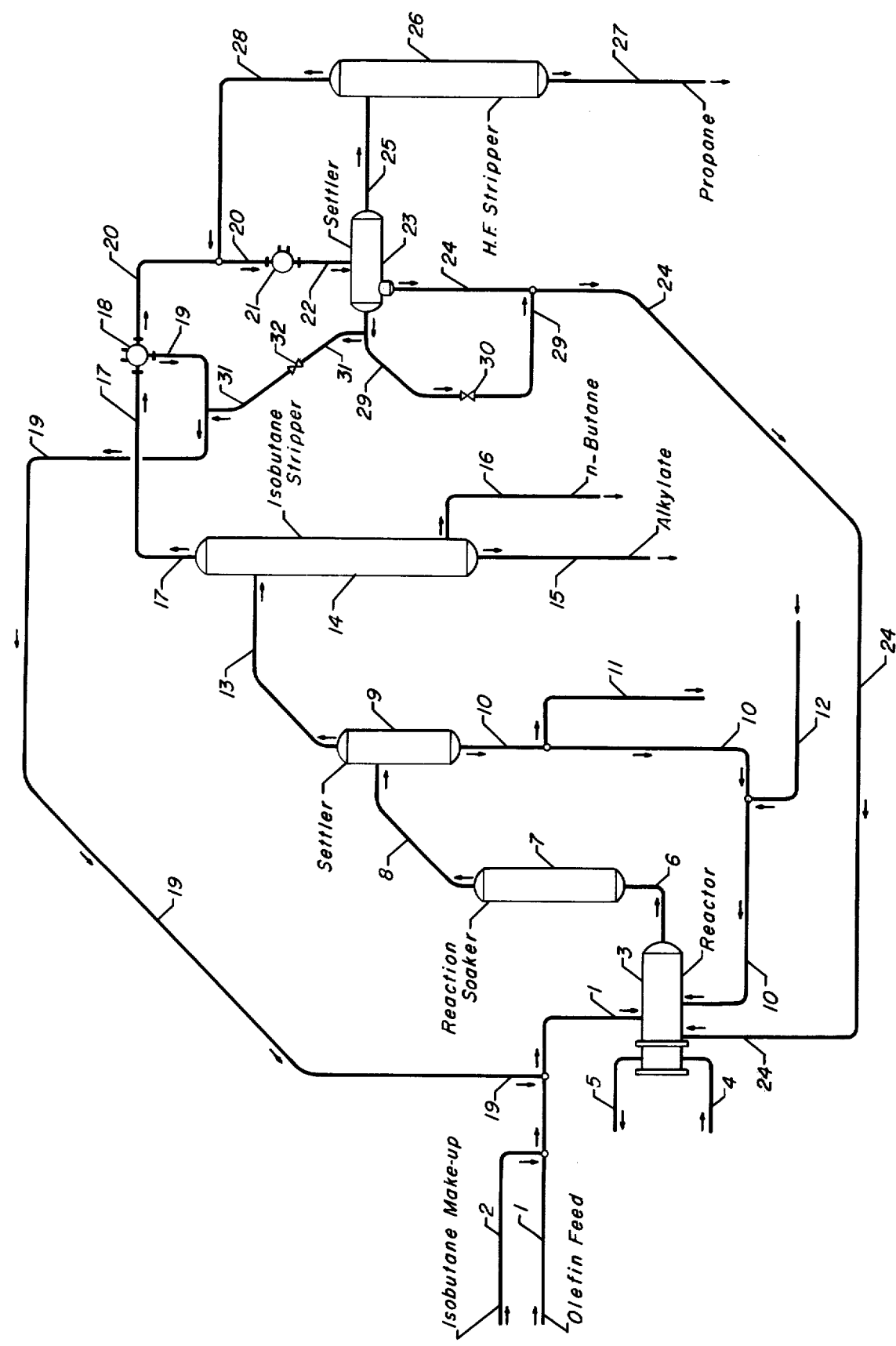

ISOBUTANE-BUTYLENE ALKYLATION PROCESS

BACKGROUND OF THE INVENTION

This invention relates to a process for alkylating isobutane with butylenes using hydrogen fluoride alkylation catalyst. In one aspect, this invention relates to an improvement in recovering isobutane from a settled hydrocarbon phase for recycle to an alkylation reactor. In another aspect, this invention relates to an improved process for producing high octane isoparaffinic hydrocarbons, suitable for use as components in motor fuel.

Alkylation of isobutane with butylenes using hydrogen fluoride catalyst is well known as a commercially important method for producing gasoline boiling range hydrocarbons. The $C_5$–$C_{10}$ hydrocarbons typically produced in isoparaffin-olefin alkylation operations are termed "alkylate." Alkylate is particularly useful as a motor fuel blending stock, since it possesses octane ratings which are high enough that the alkylate may be used to improve the overall octane rating of available gasoline pools to provide high quality motor fuel. Alkylate fuel components are particularly important in producing lead free motor fuel of sufficiently high octane. A continuing goal in the art is to provide an economically attractive alkylation process which produces superior alkylate product having motor and research octane ratings higher than alkylate which can be produced by conventional alkylation processes.

In conventional alkylation procedures, isobutane alkylation feedstocks (makeup isobutane) and recycle isobutane containing free hydrogen fluoride are combined with butylenes feedstock to form a hydrocarbon reactor charge stream. The hydrocarbon reactor charge stream thus formed is then passed into an alkylation reactor and mixed with hydrogen fluoride alkylation catalyst to form a reaction mixture or emulsion. The alkylation reaction is rapid and is substantially complete after a short residence time in the reactor. The reaction mixture is then withdrawn from the alkylation reactor and passed to a settler where the catalyst settles out to form a heavier phase which is recycled to the reactor for further use. A lighter hydrocarbon phase, containing dissolved and entrained hydrogen fluoride, is also formed in the settler. This settled hydrocarbon phase is then conventionally fractionated in an isobutane stripper to recover the alkylate product as bottoms and to separate isobutane as an overhead vapor for recycle to the alkylation reactor.

It has been found necessary to operate hydrogen fluoride catalyzed alkylation processes within a relatively narrow range of such conditions as temperature, reactant and catalyst concentrations, etc., in order to provide an acceptable yield of optimum quality alkylate product. One of the conditions found neccessary in order to provide optimum quality alkylate is a molar excess of isobutane in the hydrocarbon reactor charge stream, with respect to the amount of butylenes feedstock utilized. An isobutane/butylenes mole ratio of about 10:1 to about 30:1 is typically employed in the hydrocarbon reactor charge stream. It has been found desirable in prior art to employ as high an isobutane/butylenes ratio in the hydrocarbon feed to the alkylation reactor as is economically possible. The quality (octane rating) of alkylate produced in the process improves in proportion to the isobutane/butylenes ratio in the hydrocarbon reactor charge stream over a wide range of concentrations. In conventional operations, relatively little fresh, make-up isobutane feedstock is added to the system. Instead a large amount of hydrogen fluoride-containing isobutane is recycled from the isobutane stripper to the hydrocarbon reactor charge stream to supply the required excess isobutane in the feed to the reactor.

In the fractionation operation performed in the isobutane stripper, the hydrocarbon phase removed from the settling vessel is conventionally fractionated into at least two fractions. A bottoms fraction comprising the higher boiling alkylate product is recovered as a liquid and passed out of the system. An overhead fraction is also removed from the isobutane stripper and is conventionally recycled directly to form part of the hydrocarbon reactor charge stream after condensation. This ovehead fraction contains primarily isobutane, but also contains hydrogen fluoride which has been dissolved or entrained in the settled hydrocarbon phase during the settling operation. The isobutane stripper overhead also contains any light hydrocarbons, such as propane, charged to the system in the makeup feedstocks. The isobutane stripper overhead must be condensed before it can be recycled to the alkylation step because the alkylation step is performed under liquid phase conditions. Generally, the condensed isobutane recycle stream must also be further cooled down, after condensation, to the temperature desired for use in the alkylation reactor. When the isobutane in the overhead is thus condensed and cooled, hydrogen fluoride vapor present in the overhead is also condensed. A part of the condensed hydrogen fluoride will dissolve in the condensed isobutane. The amount of hydrogen fluoride which will thus dissolve is quite limited, however. Hydrogen fluoride solubility in isobutane is only about 1 weight percent or less at the temperature at which the isobutane is recycled to the hydrocarbon reactor charge stream. Thus, at least a portion of the condensed hydrogen fluoride in the recycle isobutane stream typically forms a separate hydrogen fluoride phase which mixes with the liquid isobutane. This hydrogen fluoride which forms a separate phase is known as "free" hydrogen fluoride. Free hydrogen fluoride is normally substantially pure acid, in contrast to alkylation catalyst which contains only about 80–90 weight percent hydrogen fluoride. Upon recycle of the condensed isobutane stripper overhead, free hydrogen fluoride present in the condensed isobutane recycle stream causes undesirable side reactions to take place when the pure hydrogen fluoride contacts the butylenes feed. The free hydrogen fluoride in the isobutane recycle stream, being substantially pure acid, very rapidly catalyzes the formation of butylenes oligomers and low quality alkylate within the hydrocarbon reactor charge stream. Since the recycle isobutane stream must be commingled with the butylenes feed prior to the introduction of the butylenes into the alkylation reactor, it has been extremely difficult in conventional alkylation operations to prevent free hydrogen fluoride present in the isobutane recycle stream from thus rapidly catalyzing the undesirable side reactions.

In commercial isobutane-butylenes alkylation operations, it is conventional to pass a portion of the overhead from the isobutane stripper into another fractionation operation, by which some of the propane in the stripper overhead is separated from isobutane and hydrogen fluoride and removed from the alkylation operation. Removal of propane from the alkylation system is necessary because propane is introduced into the system in both the isobutane makeup and butylenes alkylation feedstock. Propane is an inert diluent which builds up in the alkylation system. It must be removed continuously in order to prevent excess accumulation in the recycle hydrocarbon streams in the process. In prior art methods for removing propane from the isobutane stripper overhead, two fractionation columns are employed. A first such column, herein termed a "depropanizer," is used to separate isobutane from a mixture of propane and hydrogen fluoride. The isobutane thereby separated is recovered as a liquid bottoms fraction, while the propane and hydrogen fluoride are removed overhead from the depropanizer as vapors. A second fractionation column, herein termed a "hydrogen fluoride stripper," is then used to separate the depropanizer overhead stream into a propane bottoms fraction and a hydrogen fluoride overhead. The hydrogen fluoride removed overhead from the hydrogen fluoride stripper is recycled to the alkylation reactor. Propane removed from the hydrogen fluoride stripper as a bottoms product is taken out of the alkylation system to maintain propane balance. The depropanizer and hydrogen fluoride stripper fractionation vessels normally operate in the presence of fairly large amounts of hydrogen fluoride. They are termed "internal" fractionation vessels. The hydrocarbon feedstocks used in conventional hydrogen fluoride alkylation operations are generally fractionated in what is termed an "external depropanizer." The external depropanizer is used to fractionate butylenes, isobutane and propane. Butylenes and isobutane are recovered as a bottoms product and are thereafter fed to the alkylation process. Propane is removed overhead and is recovered for other uses. The external depropanizer is constructed to operate in the complete absence of hydrogen fluoride. It may thus be constructed from relatively less expensive materials in comparison to the internal depropanizer and hydrogen fluoride stripper.

Irrespective of the method used to provide the recycle isobutane stream and to remove propane in conventional alkylation systems, most of the isobutane recycled to the alkylation reaction step after separation from alkylate in the isobutane stripper has conventionally contained free hydrogen fluoride which is present as a separate phase in the isobutane recycle stream.

Another continuing drawback in prior art methods for fractionation and separation of alkylate, isobutane and propane has been the relatively high cost of the utilities and equipment necessary to accomplish the various separations by the conventional method. Accordingly, a continuing goal in the alkylation art is to provide a more efficient and economical method for providing a relatively pure isobutane recycle stream. Another continuing goal in the alkylation art has been to provide a more efficient and economical method for separating and removing excess amounts of propane from the alkylation system.

SUMMARY OF THE INVENTION

An object of the present invention is to provide an isobutane-butylenes alkylation process which produces a superior alkylate product with a decreased production of low octane side reaction products.

Another object of the present invention is to provide a more efficient and economical method for separating hydrogen fluoride and inert hydrocarbons from a recycle isobutane stream used in an isobutane-butylenes alkylation process.

A further object of the present invention is to provide a method for producing an isobutane recycle stream which does not contain free hydrogen fluoride and which can be employed to provide a higher quality alkylation reaction product in an isobutane-butylenes alkylation operation.

Another object of the present invention is to eliminate an internal depropanizer fractionation column in an isobutane-butylenes alkylation process using a hydrogen fluoride alkylation catalyst.

In an embodiment, the present invention relates to a process for producing an alkylation reaction product from isobutane and butylenes, utilizing hydrogen fluoride alkylation catalyst, which comprises the steps of: admixing butylenes and isobutane feedstocks, containing, in combination, from about 0.01 weight percent to about 10 weight percent propane, with an isobutane recycle stream produced as hereinafter specified to form a hydrocarbon reactor charge stream; contacting the hydrocarbon reactor charge stream with hydrogen fluoride alkylation catalyst in an alkylation reaction zone at alkylation conditions to form an alkylation reaction mixture, removing the reaction mixture from the alkylation reaction zone, settling the reaction mixture to form a settled catalyst phase and a first settled hydrocarbon phase, and recycling the settled catalyst phase to the alkylation reaction zone; fractionating the first settled hydrocarbon phase to form a gaseous first overhead fraction comprising isobutane, propane and hydrogen fluoride and a liquid first bottoms fraction comprising the alkylation reaction product, and recovering the alkylation reaction product from the first bottoms fraction; partially condensing the first overhead fraction to form a liquid condensate stream comprising from about 60 weight percent to about 90 weight percent of the isobutane contained in the first overhead fraction and an uncondensed vapor stream comprising isobutane, propane and hydrogen fluoride, and employing the condensate stream to provide at least a portion of the isobutane recycle stream utilized to form the hydrocarbon reactor charge stream; totally condensing the vapor stream and settling the resulting liquids to form a second settled hydrocarbon phase and a free hydrogen fluoride phase, and passing at least a portion of the free hydrogen fluoride phase to the alkylation reaction zone; fractionating a first portion of the second settled hydrocarbon phase to provide a second overhead fraction comprising hydrogen fluoride and a second bottoms fraction comprising propane and isobutane, passing the second overhead fraction to the total condensation step and removing the second bottoms fraction from the process; and, passing at least a portion of the remainder of the second settled hydrocarbon phase into the condensate stream formed in the partial condensation step.

Optimum alkylation conditions require that butylenes feedstock, isobutane makeup feedstock and recycle isobutane must be admixed before they are charged to the alkylation reactor. In order to achieve optimum results, makeup and recycle isobutane which are thus commingled with the butylenes feed should not contain free hydrogen fluoride. If the isobutane which is contacted with the butylenes feedstock contains substantially pure, free hydrogen fluoride, undesirable side reactions such as butylenes polymerization occur before the hydrocarbon reactor charge stream can be passed into the alkylation reactor. The present process provides a particularly suitable method for obtaining recycle isobutane which does not contain free hydrogen fluoride. In addition to providing a convenient source of recycle isobutane containing no free hydrogen fluoride, the process of the present invention eliminates a part of the fractionation operations employed in prior art to remove propane from an alkylation process. The present process obviates part of such fractionation operations by utilizing partial condensation of the overhead from an isobutane stripper. The condensate recovered from the partial condensation operation consists essentially of isobutane and is an excellent source of recycle isobutane which does not contain free hydrogen fluoride. Recycle isobutane recovered from the partial condensation step may be mixed with butylenes feed to form the hydrocarbon reactor charge stream without resulting in butylenes polymerization or other adverse side reactions. The uncondensed vapor stream which results from the partial condensation operation is subsequently completely condensed and the free, liquid hydrogen fluoride which forms is settled out. This free hydrogen fluoride phase may be passed directly back to the alkylation reactor or to the settled catalyst phase, thus avoiding contact of hydrocarbon recycle streams containing free hydrogen fluoride with butylenes feed before the butylenes are charged to the alkylation reactor. This is in contrast to prior art operations in which isobutane recycle streams containing free hydrogen fluoride are contacted with the butylenes feed before the butylenes can be charged to the alkylation reactor.

Propane is removed from the alkylation system in the present process by separating hydrogen fluoride from a portion of the settled hydrocarbon phase produced in the total condensation and settling operation, using a conventional hydrogen fluoride stripper, and withdrawing the hydrogen fluoride-free propane bottoms from the alkylation system.

DESCRIPTION OF THE DRAWING

The attached drawing is a schematic illustration of a preferred embodiment of the process of the present invention. The scope of the present invention is not limited to the embodiment shown. Various other suitable embodiments will be apparent to those skilled in the art from the attached drawing and description thereof, and from the detailed description of the invention provided hereinafter.

Referring to the drawing, a conventional butylenes alkylation feed containing a minor amount of propane is charged to the operation through conduit 1. Conventional makeup isobutane alkylation feedstock also containing a minor amount of propane is charged to the operation through conduit 2 and passed into conduit 1 where it s admixed with the butylenes feed. Recycle isobutane containing no free hydrogen fluoride, is passed into conduit 1 from conduit 19 and admixed with the butylenes feed and makeup isobutane therein. After admixing the recycle isobutane from conduit 19 with the fresh butylenes and isobutane feedstocks to form the hydrocarbon reactor charge stream in conduit 1, the reactor charge stream is passed into alkylation reactor 3 and contacted therein with hydrogen fluoride alkylation catalyst charged to reactor 3 through conduit 10. Hydrocarbons and catalyst are thoroughly admixed in reactor 3 to form a reaction mixture. Substantially all of the alkylation reaction between isobutane and butylenes takes place within a short period in reactor 3. Heat released into the reaction mixture as a result of the exothermic alkylation reaction is withdrawn by use of indirect heat exchange in reactor 3 between the reaction mixture and cooling water. Cooling water is charged to reactor 3 through conduit 4 and circulated in indirect heat exchange with reaction mixture in reactor 3 using heat exchange means not shown. Used cooling water is withdrawn from reactor 3 through conduit 5. A temperature of about 95°F. and a pressure sufficient to maintain the reaction mixture in the liquid phase are maintained in reactor 3. A contact time of about 0.1 minute to about 5 minutes is maintained in reactor 3. Thereafter, the reaction mixture is continuously withdrawn from reactor 3 and passed through conduit 6 into reaction soaker 7. The temperature and pressure maintained in soaker 7 are substantially the same as those used in reactor 3. The reaction mixture is maintained as a fairly homogeneous hydrocarbon-catalyst emulsion in soaker 7 for about 1 minute to about 10 minutes and is then continuously withdrawn and passed through conduit 8 into settler 9. In settler 9, the reaction mixture is settled allowing the catalyst and hydrocarbons to separate into distinct phases. The settled catalyst phase is withdrawn from the bottom of settler 9 and passed through conduit 10 back into reactor 3 for further catalytic use as described above. A slip stream of catalyst is withdrawn from conduit 10, either continuously or intermittently, and passed through conduit 11 to conventional catalyst regeneration means not shown. Regenerated and/or fresh hydrogen fluoride catalyst is passed back into conduit 10 through conduit 12, as needed, in order to maintain the strength of the alkylation catalyst at the desired level. Referring again to settler 9, the settled hydrocarbon phase which forms in settler 9 is withdrawn from the upper end thereof through conduit 13 and passed into isobutane stripper 14. Isobutane stripper 14 is a conventional fractionation vessel. In isobutane stripper 14, the settled hydrocarbon phase charged via conduit 13 from settler 9 is fractionated in order to separate C$_5$+ alkylate from isobutane. Alkylate comprising C$_5$+ hydrocarbons is removed from the bottom of isobutane stripper 14 through conduit 15 and is withdrawn from the operation. A conventional side cut fraction comprising n-butane is withdrawn from isobutane stripper 14 through conduit 16 to remove excess amounts of inert n-butane from the alkylation system. Isobutane and other light materials present in the settled hydrocarbon phase charged to isobutane stripper 14 are withdrawn overhead from isobutane stripper 14 via conduit 17 at a temperature of about 150°F. to about 170°F. and a pressure of about 130 psig. to about 160 psig. This overhead from the isobutane stripper contains primarily isobutane, along with some propane and hydrogen fluoride. Propane enters the alkylation operation in the same manner as does n-butane, i.e., in the isobutane makeup feedstock and butylenes feedstock which are passed into the operation. Provisions are conventionally made in alkylation operations to fractionate a portion of the isobutane stripper overhead in order to separate and withdraw propane from the operation. Conventional methods for removing propane from the operation employ two fractionation separations. The first conventional fractionation separation is to separate propane and hydrogen fluoride from isobutane in a depropanizer vessel. The second fractionation separation is to separate propane from hydrogen fluoride in a hydrogen fluoride stripper. In the present process, such a double fractionation operation is obviated through the use of partial condenser 18. The gaseous overhead from isobutane stripper 14 is passed through conduit 17 into partial condenser 18. In partial condenser 18, the isobutane-containing stream from conduit 17 is cooled to about 130°F. and a major fraction of the isobutane in the isobutane stripper overhead is condensed. The fraction of isobutane condensed is between about 50 and about 90 percent of the total isobutane content of the isobutane stripper overhead. By using this partial condensation operation for recovering liquid recycle isobutane from the isobutane stripper overhead, recycle isobutane containing no free hydrogen fluoride can be recovered for use in forming the hydrocarbon reactor charge stream. The hydrocarbon condensate recovered from this partial condensation operation generally contains substantially less than a saturated solution of hydrogen fluoride, and never contains more than a saturated solution of hydrogen fluoride at the temperature to which the recycle isobutane is cooled before being combined with the fresh feedstocks in conduit 1. Liquefied recycle isobutane is withdrawn from partial condenser 18 and passed through conduit 19 into conduit 1 where it is admixed with fresh butylenes feed and makeup isobutane, as described above. It may be desirable to cool the liquid isobutane stream in conduit 19 further, after the partial condensation step, in order to reduce the temperature to that desired for use in the alkylation reactor. This may be accomplished by using conventional heat exchange means not shown. Referring again to partial condenser 18, the cooling and partial condensing effected in partial condenser 18 is not so severe as to liquefy substantial amounts of propane or hydrogen fluoride contained in the overhead from isobutane stripper 14. Thus, the liquids recovered from partial condenser 18 do not contain any free hydrogen fluoride, and are generally not saturated with hydrogen fluoride in solution. Partial condensation of the overhead from stripper 14 is also employed to obviate the double fractionation operation utilized in prior art to remove propane from the alkylation system. The gaseous fraction recovered from partial condensation of isobutane stripper 14 overhead is withdrawn from condenser 18 through conduit 20 and passed into total condenser 21. The gaseous stream in conduit 20 contains a gaseous mixture of isobutane, propane and hydrogen fluoride. In total condenser 21, the gaseous stream charged from conduit 20 is completely condensed to form a liquid mixture. The liquid mixture includes two phases, a liquid, free hydrogen fluoride phase and a liquid hydrocarbon phase containing a saturated solution of hydrogen fluoride. The totally condensed liquid mixture is withdrawn from condenser 21 and passed through conduit 22 into settler 23. In settler 23, the free hydrogen fluoride phase settles out and is removed via conduit 24. A portion of the mixture of isobutane and propane in settler 23 is withdrawn from settler 23 via conduit 25 and passed into conventional hydrogen fluoride stripper 26. In hydrogen fluoride stripper 26, the mixture of hydrocarbons containing hydrogen fluoride in solution is fractionated to separate they hydrogen fluoride from the hydrocarbons. Hydrogen fluoride is withdrawn overhead from hydrogen fluoride stripper 26 and is passed through conduit 28 back into conduit 20 for complete recondensation. Because of imprecise fractionation, at least some propane and generally some isobutane are also passed overhead from stripper 26 along with the hydrogen fluoride. Thus, an excess amount of the hydrocarbon phase in settler 23 is passed into hydrogen fluoride stripper 26 in addition to the amount of propane which is desired to be removed as bottoms from hydrogen fluoride stripper 26 to maintain overall propane balance in the alkylation system. The bottoms product containing liquid propane and isobutane is withdrawn from hydrogen fluoride stripper 26 through conduit 27 to remove propane from the system in order to prevent buildup of propane. This liquid bottoms product may be passed to a conventional external depropanizer to recover isobutane for use in the alkylation system, if desired. As will be apparent to those skilled in the art, the amount of hydrocarbons passed into hydrogen fluoride stripper 26 from settler 23 will depend upon the amount of propane which it is desired to remove from the system. In order to remove larger amounts of propane from the alkylation system, larger amounts of the hydrocarbon phase must be passed from settler 23 into stripper 26. The hydrocarbons passed into stripper 26 must also include some propane, and possibly some isobutane, which will pass overhead from stripper 26 along with hydrogen fluoride in order to ensure that the bottoms product from stripper 26 is completely free from hydrogen fluoride. Referring again to settler 23, the remainder of the hydrocarbon phase therein is withdrawn via conduit 29. Depending upon the hydrogen fluoride content of the hydrocarbon phase in conduit 29, the hydrocarbon stream can all be passed into the isobutane recycle stream in conduit 19 or can be wholly, or partially, returned directly to reactor 24. In normal operations, valve 30 is closed off and valve 32 is opened, allowing the hydrocarbons to flow from conduit 29 through conduit 31 into conduit 19. If the hydrogen fluoride content of the hydrocarbons in conduit 19 were to be sufficiently high to result in free hydrogen fluoride in the recycled isobutane stream, so that free hydrogen fluoride might be present in conduit 19, the hydrogen fluoride-containing hydrocarbons in conduit 29 can be partially or wholly passed back directly into reactor 3 by partially or wholly closing off valve 32 and partially or wholly opening valve 30, allowing the hydrocarbon stream in conduit 29 to flow directly into reactor 3 via conduit 24. This may be done in order to avoid contacting free hydrogen fluoride with butylenes feedstock.

DETAILED DESCRIPTION OF THE INVENTION

The isobutane feedstock and butylenes feedstock employed in the process of the present invention are conventional alkylation feedstocks well known in the alkylation art. For example, a conventional makeup isobutane feedstock might contain about 95 weight percent isobutane, 4 weight percent n-butane and 1 weight percent propane. Other normal paraffins, olefins, etc., may be present in the makeup isobutane feedstock in variable, minor amounts. Likewise, the conventional butylenes feedstock used in the present process may be derived from petroleum refining processes such as catalytic cracking, and may thus ordinarily contain variable amounts of light saturates such as isobutane, n-butane, propane, etc. The process of the present invention may be utilized when the propane content of the combined makeup streams charged to the operation is between about 0.01 weight percent and about 10 weight percent of the total amount of hydrocarbons charged to the process in the makeup isobutane feed and butylenes feed.

The hydrogen fluoride catalyst employed in the present process is also well known in the art. Generally, hydrogen fluoride alkylation catalyst contains about 75 weight percent or more of titratable acid, about 5 weight percent or less of water, and about 1 weight percent to about 25 weight percent organic compounds which are soluble in hydrogen fluoride. A particularly preferred hydrogen fluoride alkylation catalyst for use in the present process contains about 85 weight percent hydrogen fluoride and less than about 1 weight percent water.

Numerous alkylation reaction zones suitable for use in the present process are known in the art. For example, but not by way of limitation, the alkylation reactors described in U.S. Pat. Nos. 3,456,033, 3,469,949 and 3,501,536 may suitably be employed as the alkylation reaction zone in the present process. Optimum alkylation conditions in specific embodiments of the present process may depend, in part, upon the particular reactor employed. The use of particular conditions associated with a particular alkylation reactor in the present process will be obvious to those skilled in the art. In general, alkylation conditions suitable for use in an embodiment of the present process include a temperature between about 0°F. and 200°F., a pressure sufficient to maintain the isobutane, butylenes, reaction products and hydrogen fluoride catalyst as liquids during the alkylation step, and a contact time between the hydrocarbons and alkylation catalyst (as a reaction mixture) of about 0.1 minute to about 30 minutes. In a preferred embodiment, utilizing a hydrogen fluoride alkylation catalyst containing about 80–90 weight percent hydrogen fluoride, a catalyst/hydrocarbon volume ratio in the alkylation reactor of about 1.5:1 is preferred, and a temperature of about 50°F. to about 150°F. is preferably employed in the alkylation reaction zone. In one preferred embodiment, the reaction mixture is passed from the reactor to a reaction soaker. Both an alkylation reactor and a reaction soaker, if it is desired to use a reaction soaker, are included within the scope of the term "alkylation reaction zone." Suitable reaction soakers are known in the art. For example, the reaction soakers described in U.S. Pat. Nos. 3,560,587 and 3,607,970 may suitably be employed in the present process. Conventionally, such reaction soakers are vessels equipped with perforated trays, baffle sections, utilized to maintain the reaction mixture of catalyst and hydrocarbons in the form of a fairly homogeneous mixture, or emulsion, for a predetermined time when the reaction mixture is passed from the reactor to the soaker. The reaction mixture of catalyst and hydrocarbons is held in the reaction soaker for a time which depends upon the composition of the particular reaction mixture in a particular embodiment. A residence time in a reaction soaker of from about 1 minute to about 30 minutes is preferred. The temperature and pressure maintained in a reaction soaker are generally about the same as the temperature and pressure maintained in the corresponding alkylation reactor. Means for settling the reaction mixture effluent from a reactor or reaction soaker in order to separate a hydrocarbon phase from a catalyst phase are well known in the alkylation art. The effluent from the alkylation reactor or soaker is a mixture of isobutane, alkylation reaction products and catalyst, normally containing small amounts of inert propane and n-butane. When this reaction mixture is allowed to stand unstirred, i.e., settled, the reaction products, isobutane, n-butane and propane form a lighter settled hydrocarbon phase with small amounts of hydrogen fluoride in solution in, and entrained therein. The catalyst forms a separate, heavier phase. The settled hydrocarbon phase is then mechanically separated from the settled catalyst phase. The temperature and pressure maintained during such a settling operation are about the same as those employed in the alkylation reactor. The hydrocarbons and the catalyst are maintained in the liquid phase during the settling step.

Some means for removing heat of reaction from the alkylation reaction mixture during the alkylation reaction is generally desirable for adequate operation of the alkylation process. A variety of means for accomplishing the heat withdrawal are well known. For example, in a preferred embodiment, heat generated by the alkylation reaction may be withdrawn directly from the alkylation reactor by indirect heat exchange between cooling water and the reaction mixture in the reactor.

After separation of the settled hydrocarbon phase from the catalyst phase in the settler, the settled hydrocarbon phase is fractionated in a vessel conventionally termed an isobutane stripper. The settled hydrocarbon phase removed from the settler contains dissolved hydrogen fluoride and also a variable amount of entrained hydrogen fluoride. Entrainment of hydrogen fluoride in the settled hydrocarbon phase results when small droplets of hydrogen fluoride fail to coalesce out of the settled hydrocarbon phase into the primary settled catalyst phase before the hydrocarbon phase is withdrawn from the settler. Fractionation vessels, such as the isobutane stripper, which are used to fractionate the settled hydrocarbon phase in an alkylation operation must accordingly be constructed of materials relatively resistant to corrosion by hydrogen fluoride. Isobutane stripper fractionation apparatus and the separation operation performed on the settled hydrocarbon phase in isobutane strippers are well known in the alkylation art. The essential fractionation requirement in the present process is the separation of a liquid fraction containing the $C_5+$ alkylate product from a gaseous overhead fraction comprising isobutane, propane and hydrogen fluoride. As an alternative to charging makeup isobutane feedstock directly to the hydrocarbon reactor charge stream, makeup isobutane may, in some cases, be charged to the isobutane stripper. When this mode of operation is used, only recycle isobutane will be employed in the hydrocarbon reactor charge stream along with the butylenes feed. Excess normal butane in the settled hydrocarbon phase charged to the isobutane stripper may be removed from the process by a conventional side cut from the isobutane stripper, if desired. Alternatively, excess normal butane may be removed from the isobutane stripper in admixture with the alkylate bottoms and subsequently separated from the bottoms. The fractionation separation utilized in the isobutane stripper in the present process may employ any suitable vessel known in the art and may include such conventional ancillary equipment as perforated tray, baffle sections, reboiling means, refluxing means etc.

The gaseous fraction recovered overhead from the isobutane stripper comprises primarily isobutane, but also contains some propane and some hydrogen fluoride. Preferably, the amount of propane present in the isobutane stripper overhead stream is from about 5 weight percent to about 25 weight percent of the total overhead stream. Hydrogen fluoride is invariably present in the settled hydrocarbon phase charged to the isobutane stripper from the settler, as discussed above. In the present process the gaseous overhead fraction removed from the isobutane stripper is passed to a partial condensation step. The equipment employed in the partial condensation operation is well known to those skilled in the art. Conventionally, partial condensers are often employed in connection with distillation columns. For example partial condensers are used when the overhead from a distillation column contains some easily condensed components and some difficulty condensed components. In such a conventional use of partial condensation the easily condensed components are liquefied via partial condensation and refluxed to the distillation column, while the difficultly condensed components are recovered in gaseous form. In the present process the gaseous overhead from the isobutane stripper is subjected to a partial condensation operation, whereby a major part of the isobutane in the gaseous overhead fraction is selectively condensed in order to form a liquid isobutane phase, while propane, hydrogen fluoride, and a minor portion of the isobutane remain in the gaseous phase. The resulting liquid isobutane phase contains substantially no free hydrogen fluoride. It is thus particularly suitable for admixture with butylenes feedstock to form the hydrocarbon reactor charge stream. In order to ensure that the liquid isobutane stream formed in the partial condensation step contains no free hydrogen fluoride and is therefore suitable for admixture with butylenes, it is essential that no more than about 90 weight percent of the isobutane contained in the overhead from the isobutane stripper is condensed during the partial condensation step. The liquid isobutane stream obtained from the partial condensation step is suitable for use in forming the hydrocarbon reactor charge stream when it contains less than about that amount of hydrogen fluoride which will remain in solution in the liquid isobutane at the temperature employed in the alkylation reactor. Preferably, the amount of hydrogen fluoride in the liquid stream resulting from the partial condensation step is less than about 1.0 weight percent of the total liquid stream. Only the very small amount of hydrogen fluoride which will thus remain in solution in isobutane at the temperature used in the alkylation reactor may be present in the isobutane recycle stream in order to prevent the formation of free hydrogen fluoride. Preferably, the amount of isobutane condensed out of the overhead fraction from the stripper during the partial condensation step is maintained between about 50 weight percent and about 90 weight percent of the total isobutane content of the isobutane stripper overhead stream. When the amount of isobutane condensed in the partial condensation step is held within this range, substantially no free hydrogen fluoride will form during the partial condensation step and no larger amount of hydrogen fluoride than a saturated solution of hydrogen fluoride will form even when the recycle isobutane is cooled to reactor temperatures. Those skilled in the art will recognize that a minimum temperature must be maintained during the partial condensation step in order to avoid liquefaction of excessive amounts of hydrogen fluoride and propane. The temperature at which the partial condensation step is performed depends upon the concentration of propane and hydrogen fluoride in the isobutane stripper overhead and also depends upon the temperature of the overhead when it is removed from the stripper.

The hydrogen fluoride-free, liquid isobutane recovered by partial condensation of the stripper overhead is recycled and admixed with fresh butylenes feed, and with makeup isobutane if desired, in order to form the hydrocarbon reactor charge. By utilizing recycle isobutane condensed in the partial condensation step, preferably with makeup isobutane which is hydrogen fluoride-free, to provide the isobutane component of the hydrocarbon reactor charge stream, it is possible to avoid the undesirable side reactions which occur when conventional recycle isobutane streams which contain free hydrogen fluoride are mixed with butylenes feed, as in a conventional alkylation process. It has been found essential to the adequate operation of a commercial alkylation process to admix the butylenes feed with large amounts of isobutane before the butylenes are charged to the alkylation reactor. It has thus been very difficult to avoid contacting the butylenes feedstock with recycle isobutane which contains a substantial amount of free hydrogen fluoride in prior art operations. This free hydrogen fluoride is substantially pure and is undesirable as an alkylation catalyst for butylenes alkylation. Undesirable side reactions such as butylenes polymerization unavoidably occur before the butylenes are charged to the alkylation reactor in prior art operations. Side reaction products such as butylenes polymers are quite undesirable in commercial alkylation operations. They are of little value as motor fuel components and are wasteful of relatively valuable butylenes feedstock. By utilizing the partial condensation step of the present process it is possible to avoid contacting the butylenes feedstock with recycle isobutane streams containing substantial amounts of free hydrogen fluoride, as was done in prior art.

After the partial condensation step has been employed to separate the isobutane stripper overhead into a liquid phase comprising isobutane and a gaseous phase comprising isobutane, propane and hydrogen fluoride vapors, the liquid isobutane stream thus formed is utilized to provide a component of the hydrocarbon reactor charge stream as described above. The gaseous mixture recovered from the partial condensation step is then subjected to a complete or total condensation step in order to form an immiscible mixture of liquid phase, free hydrogen fluoride and liquid phase isobutane and propane. The method and apparatus employed in the total condensation step are well known in the art. For example, a conventional shell and tube condenser may suitably be used in the total condensation step. The condensate formed in the total condensation step contains two immiscible phases. As referred to above, it comprises a mixture of liquid phase, free hydrogen fluoride and liquid phase hydrocarbons, primarily isobutane and propane. Preferably, the amount of propane in the liquid hydrocarbon phase is from about 10 weight percent to about 40 weight percent of the total hydrocarbon phase. The liquid hydrocarbon phase contains a small amount of hydrogen fluoride in the form of a saturated solution. In order to remove excess amounts of propane from the overall alkylation system, it is desirable to separate the dissolved hydrogen fluoride from a portion of the hydrocarbon phase and to withdraw the resulting hydrogen fluoride-free hydrocarbons from the operation. The liquid, free hydrogen fluoride phase formed in the total condensation step is first separated from the hydrocarbon phase by conventional settling and is then preferably admixed with the primary catalyst phase used in the alkylation reactor. The portion of the liquid hydrocarbon phase which is to be separated from dissolved hydrogen fluoride and withdrawn from the operation is simply that amount which will maintain the overall alkylation system is propane balance. The exact amount of hydrocarbons to be withdrawn will accordingly depend on the amount of propane entering the operation in butylenes and makeup isobutane feedstocks, the concentration of propane in the liquid hydrocarbon phase formed in the total condensation step, and also upon the total amount of liquid hydrocarbons formed in the total condensation step. It is within the ability of those skilled in the art to determine the necessary portion of the liquefied hydrocarbons which it will be necessary to separate from dissolved hydrogen fluoride and to remove from the system to maintain propane balance in the overall alkylation operation.

The portion of the liquefied hydrocarbon phase formed in the total condensation step which is to be freed from dissolved hydrogen fluoride and removed from the operation is passed to a conventional hydrogen fluoride stripper. Hydrogen fluoride strippers and their use are well known in the alkylation art. In the present process, hydrogen fluoride is recovered from the hydrogen fluoride stripper as an overhead vapor, and is recycled to the total condensation operation. The liquid bottoms product from the hydrogen fluoride stripper, comprising liquid propane and isobutane, is withdrawn from the alkylation operation. The mixture of propane and isobutane thus recovered from the operation is completely free from hydrogen fluoride. Accordingly, it may, if desired, be fractionated in a conventional external depropanizer, which need not be constructed from relatively acid resistant materials and may thus be more inexpensively constructed. As will be apparent to those skilled in the art, it may be necessary to remove some propane vapor and possibly some isobutane vapor overhead from the hydrogen fluoride stripper along with the hydrogen fluoride vapors, because of imprecise fractionation, in order to ensure that the liquid hydrocarbon bottoms stream removed from the hydrogen fluoride stripper does not contain any hydrogen fluoride.

Ordinarily, the amount of hydrogen fluoride in solution in the isobutane recycle stream produced by the partial condensation step is sufficiently low that further amounts of hydrogen fluoride may be added to the recycle stream without causing formation of free hydrogen fluoride. Any further hydrogen fluoride added forms a solution in the isobutane recycle stream and does not form a separate phase. In this case, the remainder of the hydrocarbon phase produced in the total condensation step can be combined with the isobutane recycle stream formed in the partial condensation step and thereafter contacted with the butylenes feedstock. The hydrocarbon phase produced in the total condensation and settling operation is saturated with hydrogen fluoride, and if this phase is cooled further, free hydrogen fluoride may be formed in some cases. Thus, it may be desirable to pass at least a portion of this hydrocarbon phase directly to the alkylation reactor in order to avoid adding too much hydrogen fluoride to the isobutane recycle stream. This may be the case when the isobutane recycle stream produced in the partial condensation step already contains a saturated solution of hydrogen fluoride. Generally, however, it is preferred to combine any of the settled hydrocarbon phase not withdrawn via the hydrogen fluoride stripper with the isobutane recycle stream produced in the partial condensation step for use in forming the hydrocarbon reactor charge stream.

ILLUSTRATIVE EMBODIMENT

In order to illustrate one preferred embodiment of the process of the present invention, an alkylation system identical to that shown in the attached drawing is employed. Conventional butylenes alkylation feedstock is passed into the unit via conduit 1 at the rate of 2515 barrels per day butylenes, 1500 barrels per day isobutane, 415 barrels per day n-butane, 50 barrels per day propane and 27 barrels per day propylene. Conventional makeup isobutane feedstock is passed into the unit via conduit 2 at the rate of 1640 barrels per day isobutane, 80 barrels per day n-butane and 10 barrels per day propane. The butylenes feedstock and makeup isobutane feedstock are combined and mixed, in conduit 1, with an isobutane recycle stream from conduit 19, which is passed into conduit 1 at the rate of 27,950 barrels per day isobutane, 4200 barrels per day propane and 2,800 barrels per day n-butane, with 194 barrels per day of hydrogen fluoride in solution in the hydrocarbons. The resulting hydrocarbon reactor charge stream is passed through conduit 1 into reactor 3 and admixed therein with hydrogen fluoride catalyst from conduit 10 and free hydrogen fluoride passed into reactor 3 from conduit 24 at the rate of 46 barrels per day. The hydrocarbons and catalyst are charged to reactor 3 at a catalyst/hydrocarbons volume ratio of 1.5:1. The reaction mixture, or emulsion, formed in reactor 3 from the hydrocarbons and catalyst is held therein at a temperature of about 95°F. for about 1 minute at a pressure sufficient to maintain liquid phase operations and is then withdrawn and passed through conduit 6 into reaction soaker 7, where the reaction mixture is held for a residence time of about 10 minutes. The reaction mixture is then passed from reaction soaker 7 through conduit 8 into settler 9. The reaction mixture in settler 9 separates into a lower settled catalyst phase and an upper settled hydrocarbon phase. The settled catalyst phase is withdrawn from settler 9 via conduit 10 and is passed back into reactor 5 for further use. The settled hydrocarbon phase is passed from settler 9 through conduit 13 into isobutane stripper 14 at the rate of 28,190 barrels per day isobutane, 4,500 barrels per day of $C_5+$ alkylate, 4,260 barrels per day propane and 3,295 barrels per day of n-butane, along with 240 barrels per day of dissolved and entrained hydrogen fluoride. The settled catalyst phase is fractionated in isobutane stripper 14 to separate the $C_5+$ alkylate product as a bottoms product, n-butane as a side-cut fraction and a mixture of isobutane, propane, n-butane and hydrogen fluoride as an overhead vapor. $C_5+$ alkylate product is withdrawn from the bottoms of stripper 14 via conduit 15 at the rate of 4,500 barrels per day. A stream rich in n-butane is withdrawn as a side cut via conduit 16 at the rate of 475 barrels per day of n-butane and 50 barrels per day of isobutane. The stripper overhead vapor is withdrawn via conduit 17 at the rate of 28,140 barrels per day isobutane, 4,260 barrels per day propane, 2,820 barrels per day of n-butane and 240 barrels per day of hydrogen fluoride. The overhead from stripper 14 is passed through conduit 17 znto partial condenser 18, where it is cooled and partially liquefied. A liquid isobutane recycle stream is withdrawn from partial condenser 18 via conduit 19 at the rate of 25,300 barrels per day isobutane, 3,445 barrels per day of propane, 2,575 barrels per day n-butane and 166 barrels per day of hydrogen fluoride in solution in the hydrocarbons. An uncondensed vapor stream is withdrawn from partial condenser 18 via conduit 20 at the rate of 2,800 barrels per day isobutane, 815 barrels per day propane, 245 barrels per day n-butane and 74 barrels per day hydrogen fluoride. The vapor stream in conduit 20 is passed into total condenser 21 and is completely liquefied therein. The resulting liquids are withdrawn from total condenser 21 and passed through conduit 22 into settler 23. The liquids in settler 23 are maintained at a temperature of about 100°F. Free hydrogen fluoride in settler 23 is settled out as a separate phase and is withdrawn from the bottom of settler 23 through conduit 24 at the rate of 46 barrels per day of free hydrogen fluoride and is returned to reactor 3 through conduit 24. A portion of the hydrocarbon phase in settler 23 is withdrawn via conduit 25 and passed into hydrogen fluoride stripper 26 at the rate of 290 barrels per day isobutane, 85 barrels per day propane, and 25 barrels per day n-butane, along with 3.5 barrels per day hydrogen fluoride in solution in the hydrocarbon. All hydrogen fluoride is removed overhead from stripper 26 along with part of the hydrocarbon charged thereto and the overhead is passed through conduit 28 into conduit 20 at the rate of 100 barrels per day isobutane, 25 barrels per day propane, 5 barrels per day n-butane and 3.5 barrels per day hydrogen fluoride. A propanerich stream is withdrawn as a bottoms product from stripper 26 via conduit 27 at the rate of 190 barrels per day isobutane, 60 barrels per day propane and 20 barrels per day n-butane. The remainder of the hydrocarbon phase in settler 23 is withdrawn therefrom via conduit 29. Valve 30 is closed off and valve 32 is opened. The hydrocarbon stream in conduit 29 is passed into conduit 19 at the rate of 2,650 barrels per day isobutane, 755 barrels per day propane and 225 barrels per day n-butane along with 28 barrels per day of hydrogen fluoride in solution in the hydrocarbon and the hydrocarbon stream in conduit 29 is combined with the isobtane recycle stream in conduit 19 for recycle to conduit 1 as described above.

It will be apparent to those skilled in the art from the foregoing detailed description and illustrative embodiment that the process of the present invention provides a novel and superior method for producing motor fuel alkylate from isobutane and butylenes using hydrogen fluoride alkylation catalyst. By employing the process of the present invention, side reactions of the butylenes feedstock are substantially eliminated. The process of the present invention also obviates a substantial part of the conventional procedure utilized to eliminate propane from the alkylation system, thereby avoiding construction of relatively expensive, acid resistant fractionation apparatus.

We claim as our invention:

1. A process for producing an alkylation reaction product from isobutane and butylenes, utilizing hydrogen fluoride alkylation catalyst, which comprises:
   a. admixing butylenes and isobutene feedstocks, said admixture containing from about 0.01 weight percent to about 10 weight propane;
   b. said admixture being further combined with an isobutane recycle stream, derived as hereinafter specified, to form a hydrocarbon reactor charge stream;
   c. admixing said hydrocarbon reactor charge stream with hydrogen fluoride alkylation catalyst in an alkylation reaction zone at alkylation conditions to form an alkylation reaction mixture;
   d. settling the reaction mixture to form a settled catalyst phase and a first settled hydrocarbon phase;
   e. recycling at least a portion of said settled catalyst phase to said alkylation reaction zone;
   f. fractionating said first settled hydrocarbon phase to separate a first vapor comprising isobutane, propane and hydrogen fluoride from a liquid comprising said alkylation reaction product;
   g. partially condensing said vapor to form a liquid condensate stream containing from about 50 weight percent to about 90 weight percent of the isobutane in said vapor and an uncondensed vapor stream comprising isobutane, propane and hydrogen fluoride;
   h. admixing said liquid condensate stream with said feedstocks as said isobutane recycle stream in step (a);
   i. condensing said uncondensed vapor stream and settling the resulting condensate to form a second settled hydrocarbon phase and a hydrogen fluoride phase;
   j. stripping a first portion of said second settled hydrocarbon phase to separate hydrogen fluoride vapor from propane and isobutane;
   k. commingling said hydrogen fluoride vapor from step (j) with said uncondensed vapor stream from step (i) to be condensed therewith as aforesaid;
   (l). commingling a second portion of said second settled hydrocarbon phase with said liquid condensate stream for admixture with said feedstocks.

2. The process of claim 1 wherein at least a portion of said hydrogen fluoride phase is returned to said alkylation reaction zone.

3. The process of claim 1 wherein said first vapor contains from about 5 weight percent to about 25 weight percent propane.

4. The process of claim 1 wherein said second settled hydrocarbon phase contains from about 10 weight percent to about 40 weight percent propane.

5. The process of claim 1 wherein said isobutane recycle stream admixed with said feestocks contains less than about 1.0 weight percent hydrogen fluoride.

* * * * *